United States Patent
Brochard et al.

(10) Patent No.: US 9,189,273 B2
(45) Date of Patent: Nov. 17, 2015

(54) PERFORMANCE-AWARE JOB SCHEDULING UNDER POWER CONSTRAINTS

(71) Applicant: LENOVO Enterprise Solutions (Singapore) PTE. LTD., New Tech Park (SG)

(72) Inventors: Luigi Brochard, Paris (FR); Rajendra D. Panda, Austin, TX (US); Francois Thomas, Alencon (FR)

(73) Assignee: Lenovo Enterprise Solutions PTE. LTD. (SG)

( * ) Notice: Subject to any disclaimer, the term of this patent is extended or adjusted under 35 U.S.C. 154(b) by 67 days.

(21) Appl. No.: 14/193,075

(22) Filed: Feb. 28, 2014

(65) Prior Publication Data

US 2015/0248312 A1 Sep. 3, 2015

(51) Int. Cl.
G06F 9/455 (2006.01)
G06F 9/48 (2006.01)

(52) U.S. Cl.
CPC ............ *G06F 9/4881* (2013.01); *G06F 9/4893* (2013.01)

(58) Field of Classification Search
None
See application file for complete search history.

(56) References Cited

U.S. PATENT DOCUMENTS

| | | | |
|---|---|---|---|
| 6,549,930 B1 * | 4/2003 | Chrysos et al. | 718/104 |
| 7,958,508 B2 | 6/2011 | Shimizu et al. | |
| 8,010,822 B2 | 8/2011 | Marshall et al. | |
| 8,527,997 B2 | 9/2013 | Bell, Jr. et al. | |
| 8,612,984 B2 | 12/2013 | Bell, Jr. et al. | |
| 2003/0135621 A1 * | 7/2003 | Romagnoli | 709/226 |
| 2012/0216205 A1 * | 8/2012 | Bell et al. | 718/102 |
| 2013/0139170 A1 * | 5/2013 | Prabhakar et al. | 718/104 |
| 2013/0305251 A1 | 11/2013 | Yamauchi et al. | |
| 2014/0359633 A1 * | 12/2014 | Breternitz et al. | 718/104 |

FOREIGN PATENT DOCUMENTS

CN 101539800 9/2009

OTHER PUBLICATIONS

Anonymous, "Allocation of Partitions to Nodes in a Power-Aware Computing system," IP.com No. IPCOM000201577D, Nov. 15, 2010.
Anonymous, "Power-aware VM scheduling in a cloud data center," IP.com No. IPCOM000196870D, Jun. 18, 2010.

* cited by examiner

*Primary Examiner* — Kenneth Tang
(74) *Attorney, Agent, or Firm* — Kunzler Law Group; Katherine Brown

(57) ABSTRACT

A method, system, and computer program product for processing an application in a high performance computing (HPC) data center are described. The method includes analyzing and sorting a plurality of nodes in a cluster of the HPC data center into a plurality of frequency bins, each of the plurality of nodes being sorted into more than one of the plurality of frequency bins based on performance. The method also includes analyzing and sorting the application into an application bin among a plurality of application bins based on a frequency scaling characteristic of the application. The method further includes selecting a first set of nodes among the plurality of nodes to process the application, the first set of nodes being sorted into a first frequency bin among the plurality of frequency bins corresponding with the application bin of the application.

14 Claims, 4 Drawing Sheets

PERFORMANCE-AWARE JOB SCHEDULING UNDER POWER CONSTRAINTS

BACKGROUND

The present invention relates generally to high performance computing, and more specifically, to performance-aware job scheduling under power constraints.

A high performance computing (HPC) data center includes a cluster of nodes with high performance interconnects. Each node includes multiple processors. Typically, the nodes in a cluster have identical configurations (e.g., dual in-line memory module (DIMM) types, size of random access memory (RAM)). Each node has a total design power (TDP) rating which cannot be exceeded to maintain full functionality. An application (job) is submitted for processing to a job scheduler of the HPC data center that implements an application or algorithm to allocate resources to process the application. Each application may be processed by one or more nodes according to the resources allocated by the job scheduler.

SUMMARY

Embodiments include a method, system, and computer program product for processing an application in a high performance computing (HPC) data center. According to one embodiment a computer program product for processing an application in a high performance computing (HPC) data center includes a tangible storage medium readable by a processing circuit. The tangible storage medium stores instructions for execution by the processing circuit for performing a method. The method includes analyzing and sorting a plurality of nodes in a cluster of the HPC data center into a plurality of frequency bins, each of the plurality of nodes being sorted into more than one of the plurality of frequency bins based on performance. The method also includes analyzing and sorting the application into an application bin among a plurality of application bins based on a frequency scaling characteristic of the application, a number of the plurality of frequency bins being a same as a number of the plurality of application bins and each of the plurality of application bins corresponding with one of the plurality of frequency bins. The method further includes selecting a first set of nodes among the plurality of nodes as processing nodes to process the application, the first set of nodes being sorted into a first frequency bin among the plurality of frequency bins corresponding with the application bin of the application.

According to another embodiment, a method of processing an application in a high performance computing (HPC) data center includes analyzing and sorting, using a processor, a plurality of nodes in a cluster of the HPC data center into a plurality of frequency bins, each of the plurality of nodes being sorted into more than one of the plurality of frequency bins based on performance. The method also includes analyzing and sorting the application into an application bin among a plurality of application bins based on a frequency scaling characteristic of the application, a number of the plurality of frequency bins being a same as a number of the plurality of application bins and each of the plurality of application bins corresponding with one of the plurality of frequency bins. The method further includes selecting a first set of nodes among the plurality of nodes to process the application, the first set of nodes being sorted into a first frequency bin among the plurality of frequency bins corresponding with the application bin of the application.

According to yet another embodiment, a job scheduler in a high performance computing (HPC) data center includes a memory device. The memory device stores a sorting of a plurality of nodes in a cluster of the HPC data center into a plurality of frequency bins based on performance, each of the plurality of nodes being sorted into more than one of the plurality of frequency bins. The memory device also stores a sorting of an application submitted for processing into one of a plurality of application bins based on a frequency scaling characteristic, a number of the plurality of frequency bins being a same as a number of the plurality of application bins and each of the plurality of application bins corresponding with one of the plurality of frequency bins. The job scheduler also includes a processor to select a first set of nodes among the plurality of nodes as processing nodes to process the application, the first set of nodes being sorted into a first frequency bin among the plurality of frequency bins corresponding with the application bin of the application.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

As noted above, one or more nodes in a cluster of nodes are used to process an application submitted to an HPC data center. A given cluster of the HPC data center must comply with a cap on power consumption by its nodes. Embodiments of the invention detailed herein relate to selecting nodes to process the application by balancing performance increase with power constraint compliance.

Currently, in determining which nodes should be used to process a particular application, job scheduling algorithms consider nodal attributes such as total available RAM and whether a given node is idle or not. Embodiments described herein consider performance capability of the nodes and, additionally, frequency scaling characteristics of the applications. By using both the node and application characteristics, embodiments of the invention balance the desired increase in performance with the corresponding increase in power consumption.

Figure 1:
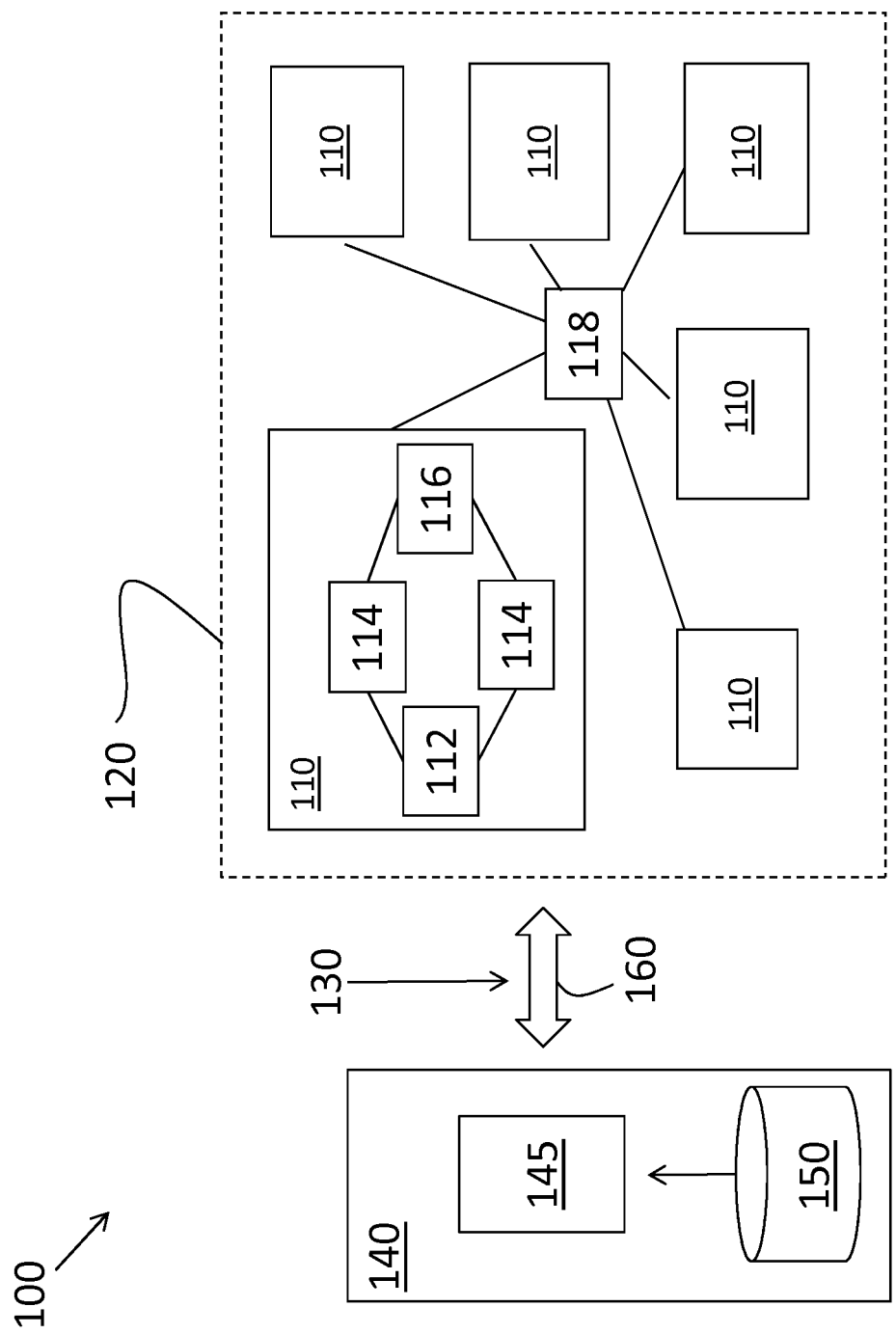
FIG. 1 is a block diagram of aspects of a high performance computing (HPC) data center.

FIG. 1 is a block diagram of aspects of a high performance computing (HPC) data center 100. A cluster 120 is shown to include multiple nodes 110. As shown in FIG. 1, each node includes an interface 112 to receive inputs, provide outputs, and interconnect with other nodes, two processors 114, and a memory device 116 (e.g., RAM). Alternate embodiments of the node 110 may include one or more than two processors 114 and one or more memory devices 116. Interconnect 118 is a high performance network that connects all the nodes 110 in the cluster 120. Interconnect 118 is used for internode communication among nodes 110 when an application 130 is run on a set of nodes 110 as specified by the job scheduler 140. An application 130 is input to the HPC data center 100 for processing. The application 130 is initially handled by a job scheduler 140 that assigns the appropriate nodes 110 in the cluster 120 to process the application 130, as further detailed below. The job scheduler 140 can be regarded as a controller and includes an interface (e.g., network interface 160) to receive inputs and provide outputs. For explanatory purposes, the job scheduler 140 is shown as a separate component that includes a separate processor 145. The processor 145 executes an application (algorithm) and uses data regarding both the nodes 110 and the application 130 to assign jobs (application 130 processing tasks) to specified nodes 110. In alternate embodiments, the job scheduler 140 functionality described herein may be performed by one of the nodes 110. The data used by the job scheduler 140, as well as the algorithm executed by the job scheduler 140, may be stored in one or more storage devices 150.

As noted above, a node 110 cannot exceed its TDP. A node 110 that is operated at its rated (nominal) clock frequency consumes less power than its TDP. As a result, it is possible to overclock a node 110 (operate the node 110 at a higher clock speed than nominal), but overclocking results in increased power consumption. Thus, overclocking a node 110 for a potential increase in performance is possible, but only up to the number of levels (multiples) of overclocking that result in power consumption at or near the node TDP. Although the nodes 110 of a cluster 120 likely have identical configurations, the margin between power consumption at nominal operating frequency and TDP (and thus the allowable number of levels of overclocking) differs for each node 110. Nodes 110 that have a relatively high margin (and thus a greater allowable number of levels of overclocking) among the nodes 110 in the cluster 120 are called cold nodes, while nodes 110 that have a relatively low margin (and thus a lower allowable number of levels of overclocking) among the nodes 110 in the cluster 120 are called hot nodes.

From the perspective of an application 130, overclocking may not necessarily improve performance. The cycles per instruction (CPI) profile of a given application 130 affects whether the performance of the application 130 is improved by overclocking the node 110 or nodes 110 executing the application 130. That is, the performance of an application 130 with relatively lower CPI tracks node 110 clock speed more closely such that overclocking a node 110 that processes the application 130 will improve performance, and the performance of an application 130 with relatively higher CPI is less affected by node 110 clock speed. Thus, as further discussed below, not only the node 110 power consumption characteristics (e.g., whether a node 110 is a hot node or a cold node) but also the application frequency scaling characteristics (in addition to the priority assigned to an application 130) are considered in selecting nodes 110 to process a given application 130.

Figure 2:
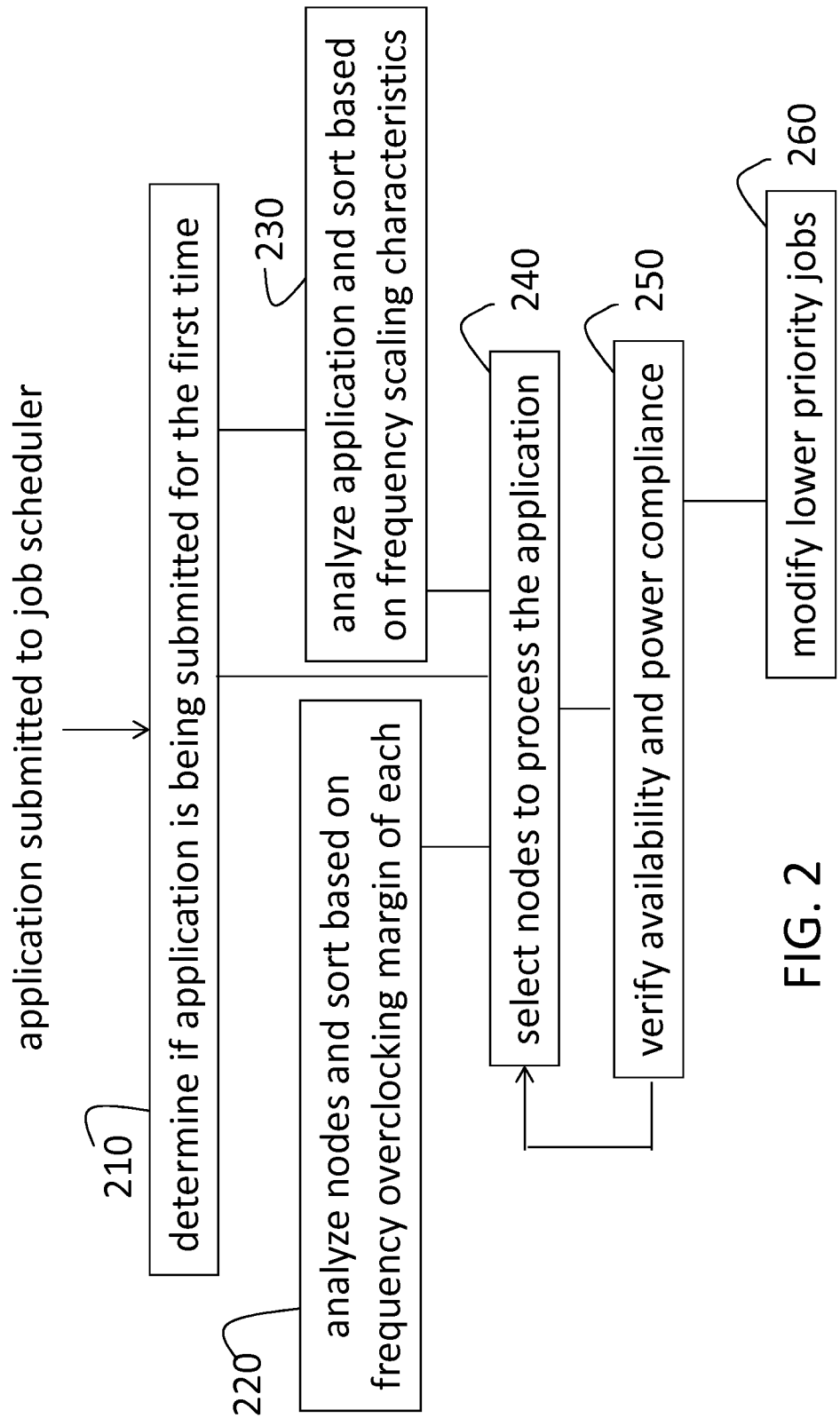
FIG. 2 is a process flow of a method of processing an application using nodes in a high performance computing (HPC) data center according to an embodiment of the invention.

FIG. 2 is a process flow of a method of processing an application 130 using nodes 110 in a high performance computing (HPC) data center 100 according to an embodiment of the invention. At block 210, determining if an application 130 is being submitted for the first time is performed when an application 130 is submitted to the job scheduler 140 and is further discussed below. An exemplary application 130 is a weather forecast application. This application 130 may be submitted to the job scheduler 140 for processing any number of times. Each time, the input (weather-related variables) may be different. Other exemplary applications 130 include climate modeling and molecular modeling simulations, which may be executed periodically, for example. When the job (application 130) is being submitted for the first time, the analysis of the application 130 discussed below with reference to block 230 is performed. When the job had been submitted previously (with the same or different input variable values), the process flow proceeds to block 240, which is also further discussed below. At block 220, analyzing the nodes 110 and sorting based on frequency overclocking margin of each may be done when the nodes 110 in the cluster 120 are deployed and may be repeated when a configuration or environmental change occurs. The process at block 220 need not be performed again for each different application 130 submission to the job scheduler 140. The sorting, when completed, may be stored in the memory device 150 associated with the job scheduler 140 or in a different memory device that is accessible to the job scheduler 140. An exemplary embodiment of analyzing the nodes 110 and sorting based on frequency overclocking margin is further detailed with reference to FIG. 3.

Figure 3:
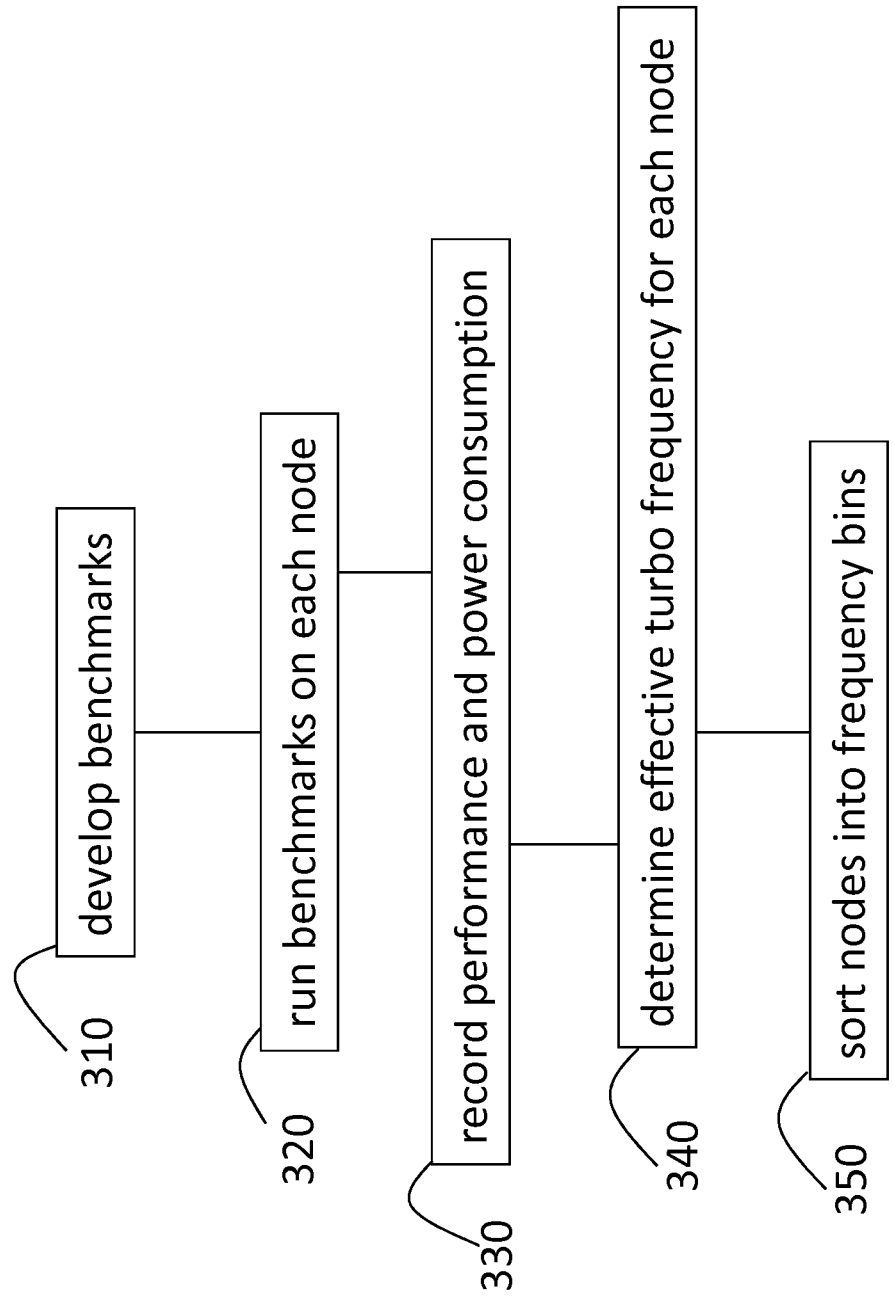
FIG. 3 is a process flow of a method of analyzing the nodes of a cluster according to an embodiment of the invention.

FIG. 3 is a process flow of a method of analyzing the nodes 110 of a cluster 120 according to an embodiment of the invention. At block 310, developing benchmarks to run on the nodes 110 includes varying the CPI profile of each of the benchmarks. Running the benchmarks on each node 110, at block 320, includes operating each node 110 at the nominal frequency as well as at each allowed turbo frequency (overclocking level) for each benchmark. At block 330, recording performance and power consumption includes recording the information for each node 110 at each frequency for each benchmark. Determining the effective turbo frequency of each node 110, at block 340, is based on analyzing the information. As noted above, despite identical configurations, each of the nodes 110 has a different maximum number of overclocking levels (effective turbo frequency) to reach TDP. In addition, each benchmark CPI profile results in different performance among the nodes 110. Thus, based on the analysis of the recorded performance and power consumption information, the maximum allowable number of overclocking levels for each of the different benchmarks (having different CPI profiles) may be identified for each of the nodes 110. Once the effective turbo frequency of each node 110 is determined, sorting the nodes 110 into frequency bins, at block 350, includes creating bins with specified turbo frequency ranges. For example, if the nominal frequency ($f_{nom}$) for the nodes 110 were 2.7 gigahertz (GHz), each bin may have a range of 0.1 GHz. Thus, the frequency range of each node 110 bin, j, is given by:

$$(f_{nom}+0.1*j, f_{nom}+0.1*j+0.1) \quad [EQ.1]$$

Each node 110 would have an effective turbo frequency for each CPI of the benchmark, given by $f_{max}(i,k)$, where i=CPI of the benchmark, and k=node. Once the frequency ranges of the frequency bins are established, each $f_{max}(i,k)$ is sorted into the appropriate bin. Thus, a given node 110 is likely to be sorted into several frequency bins because the $f_{max}$ associated with the same node 110 (k) is likely to be different for different benchmark CPIs (i). Once all the nodes 110 at all the benchmark CPIs are sorted in the bins, the operating frequency values within each bin are reset to the lowest frequency in the frequency range of the respective bin. This is to ensure that all the nodes 110 in a bin operate at the same frequency if selected.

Returning to the process shown at FIG. 2, analyzing an application 130 and sorting based on frequency scaling characteristics, at block 230, is done the first time an application 130 is submitted to the job scheduler 140. The process may be repeated based on user initiation or a time period since the previous submission of the application 130, for example. The application 130 may be submitted with an identifier (tag) that is used by the job scheduler 140 to determine whether the application 130 has or has not been submitted previously (at block 210). The identifier or tag and information obtained for an application 130 (block 230) may be stored in the memory device 150 of the job scheduler 140 or another storage device accessible by the job scheduler 140. In additional embodiments, timing information regarding the submission may also be stored to ascertain whether the process at block 230 should be repeated, for example.

Analyzing the application 130 at block 230 includes running the application 130 using a number N of nodes 110 of the cluster 120 at one or more frequencies. Through the one or more executions, a profile of performance and power consumption to frequency may be developed for the application 130. This profile is used to sort the application 130 into an application bin. The number of application bins is equal to the number of frequency bins into which nodes 110 were sorted as described with reference to FIG. 3. This is because each application bin corresponds with a frequency bin. For example, applications 130 that have nearly linear frequency scaling (performance of the application 130 processing scales close to linearly as frequency of the nodes 130 increases) will be sorted into the application bin corresponding with the frequency bin associated with the highest effective turbo frequency range, because these applications 130 gain the highest performance boost based on overclocking. On the other end of the range, applications 130 that are memory bandwidth dependent and show no benefit from frequency scaling are sorted into the application bin corresponding with the frequency bin associated with the lowest effective turbo range (where nodes 110 operate at or closest to nominal frequency, $f_{nom}$).

Selecting nodes 110 to process the application 130, at block 240, is based on the application bin corresponding with the application 130 that was submitted to the job scheduler 140. The application bin is either determined in the current job processing cycle (block 230) or determined based on the stored information. In the frequency bin corresponding with the application bin into which the application 130 is sorted, N nodes 110 are selected to process the application 130. Verifying availability and power compliance at block 250 includes determining if N idle nodes 110 are available in the frequency bin corresponding with the application bin of the application 130 and also determining whether the power constraint would be met by the N nodes 110 processing the application 130. When it is determined that N idle nodes 110 are not available in the frequency bin corresponding with the application bin of the application 130, N nodes 110 in the adjacent (lower effective turbo frequency range) frequency bin are checked for availability. This process of checking adjacent frequency bins is repeated until N idle nodes 110 (N available nodes 110) are found. If the process terminates (the lowest turbo frequency frequency bin is reached before N idle nodes 110 are found), then the application 130 may be put back in the queue by the job scheduler 140 for later scheduling. The process of determining whether the power constraint would be met by the N available nodes 110 processing the application 130 is performed as discussed with reference to FIG. 4.

Figure 4:
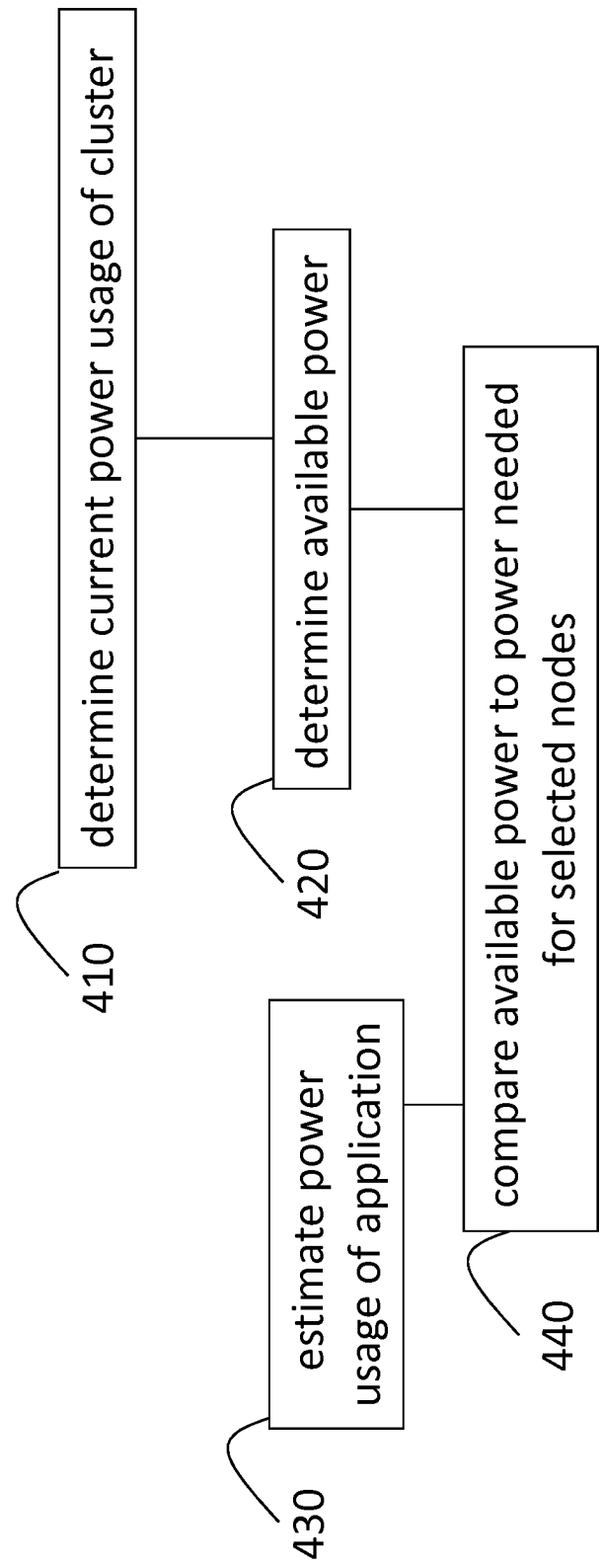
FIG. 4 is a process flow of a method of determining whether selected nodes meet the cluster power constraints according to an embodiment of the invention.

FIG. 4 is a process flow of a method of determining whether selected nodes 110 meet the cluster 120 power constraints according to an embodiment of the invention. At block 410, determining current power usage of the cluster 120 is done when the application 130 is submitted. The determining may be done by the processor 145 of the job scheduler 140, for example. The current power usage value ($P_{current}$) may be updated not only each time an application 130 is submitted for processing but also when an application 130 is executed at a different frequency (i.e. an application 130 that was submitted prior to the newly submitted application 130 is processed at a different frequency) or when processing of an application 130 is completed. Determining available power ($P_{available}$), at block 420, is based on a known power usage cap ($P_{cap}$) on the cluster 120 and is found as:

$$P_{available} = P_{cap} - P_{current} \quad [\text{EQ. 2}]$$

At block 430, estimating power usage of the application 130 ($P_{app}$) is based on the N nodes 110 selected at block 240 (FIG. 2) and verified at block 250. At block 440, comparing available power to power needed for the selected nodes 110 (the N nodes 110 selected to process the application 130) includes determining whether $P_{app} < P_{available}$. If $P_{app} > P_{available}$, then the estimated power required for the N nodes 110 selected for the application 130 (at block 240) is too high. In this case, the frequency at which nodes 110 selected for processing of one or more other applications 130 (submitted before the current application 130), with lower priority, may be lowered. The relative priority of each application 130 submitted to the job scheduler 140 may be indicated on the identifier or tag of the application 130. This adjustment of frequency for processing one or more other applications 130 is referenced above in noting that the $P_{current}$ may be updated when an application 130 other than the latest application 130 submitted to the job scheduler 140 is executed at a different frequency. When such a frequency adjustment of another application 130 is not possible, control is returned back to block 240 (FIG. 2) to repeat the selection of N nodes 110 sorted into a lower frequency bin and then repeat the verification of power compliance (block 250). When N nodes 110 that comply with the power constraints for the cluster 120 are not found through this iterative process, the application 130 is put back in the job queue by the job scheduler 140 for later processing. The later processing may be based on a predetermined period, for example.

Technical effects and benefits include considering both performance and power compliance on the basis of whether an application 130 benefits from overclocking and warrants overclocking based on its priority.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for processing an application in a high performance computing (HPC) data center, the computer program product comprising:
   a tangible storage medium readable by a processing circuit and storing instructions for execution by the processing circuit for performing a method comprising:
   analyzing and sorting a plurality of nodes in a cluster of the HPC data center into a plurality of frequency bins, each of the plurality of nodes being sorted into more than one of the plurality of frequency bins based on performance;
   analyzing and sorting the application into an application bin among a plurality of application bins based on a frequency scaling characteristic of the application, a number of the plurality of frequency bins being a same as a number of the plurality of application bins and each of the plurality of application bins corresponding with one of the plurality of frequency bins;
   selecting a first set of nodes among the plurality of nodes as processing nodes to process the application, the first set of nodes being sorted into a first frequency bin among the plurality of frequency bins corresponding with the application bin of the application;
   verifying an availability of the first set of nodes, wherein when the first set of nodes is not available, a second set of nodes from a second frequency bin adjacent to the first frequency bin are selected as the processing nodes;

determining whether an estimated power consumption by the processing nodes is less than an available power; and reducing a frequency of processing a second application with a lower priority than the application when the estimated power consumption exceeds the available power.

2. The computer program product according to claim 1, wherein the analyzing and sorting the plurality of nodes includes running a plurality of benchmark applications on the plurality of nodes, the plurality of benchmark applications including varying cycles per instruction (CPI) profiles.

3. The computer program product according to claim 2, wherein the analyzing and sorting the plurality of nodes includes determining a maximum allowable frequency of operation, corresponding with a frequency bin among the plurality of frequency bins, for each of the plurality of nodes for each of the CPI profiles of the plurality of benchmark applications.

4. The computer program product according to claim 1, further comprising determining whether the application is being submitted to the HPC data center for the first time based on an identifier submitted with the application, wherein the analyzing and sorting the application is done when the application is submitted to the HPC data center for the first time.

5. The computer program product according to claim 1, wherein the analyzing and sorting the application includes processing the application one or more times at respective one or more frequencies to determine the frequency scaling characteristic of the application, the frequency scaling characteristic of the application corresponding with the application bin among the plurality of application bins.

6. A method of processing an application in a high performance computing (HPC) data center, the method comprising:

analyzing and sorting, using a processor, a plurality of nodes in a cluster of the HPC data center into a plurality of frequency bins, each of the plurality of nodes being sorted into more than one of the plurality of frequency bins based on performance;

analyzing and sorting the application into an application bin among a plurality of application bins based on a frequency scaling characteristic of the application, a number of the plurality of frequency bins being a same as a number of the plurality of application bins and each of the plurality of application bins corresponding with one of the plurality of frequency bins;

selecting a first set of nodes among the plurality of nodes to process the application, the first set of nodes being sorted into a first frequency bin among the plurality of frequency bins corresponding with the application bin of the application;

verifying an availability of the first set of nodes, wherein when the first set of nodes is not available, a second set of nodes from a second frequency bin adjacent to the first frequency bin are selected as the processing nodes;

determining whether an estimated power consumption by the processing nodes is less than an available power; and reducing a frequency of processing a second application with a lower priority than the application when the estimated power consumption exceeds the available power.

7. The method according to claim 6, wherein the analyzing and sorting the plurality of nodes includes running a plurality of benchmark applications on the plurality of nodes, the plurality of benchmark applications including varying cycles per instruction (CPI) profiles.

8. The method according to claim 7, wherein the analyzing and sorting the plurality of nodes includes determining a maximum allowable frequency of operation, corresponding with a frequency bin among the plurality of frequency bins, for each of the plurality of nodes for each of the CPI profiles of the plurality of benchmark applications.

9. The method according to claim 6, wherein the method further comprises determining whether the application is being submitted to the HPC data center for the first time based on an identifier submitted with the application, wherein the analyzing and sorting the application is done when the application is submitted to the HPC data center for the first time.

10. The method according to claim 6, wherein the analyzing and sorting the application includes processing the application one or more times at respective one or more frequencies to determine the frequency scaling characteristic of the application, the frequency scaling characteristic of the application corresponding with the application bin among the plurality of application bins.

11. A job scheduler in a high performance computing (HPC) data center, the job scheduler comprising:

a memory device configured to store a sorting of a plurality of nodes in a cluster of the HPC data center into a plurality of frequency bins based on performance, each of the plurality of nodes being sorted into more than one of the plurality of frequency bins, and further configured to store a sorting of an application submitted for processing into one of a plurality of application bins based on a frequency scaling characteristic, a number of the plurality of frequency bins being a same as a number of the plurality of application bins and each of the plurality of application bins corresponding with one of the plurality of frequency bins; and a processor configured to select a first set of nodes among the plurality of nodes as processing nodes to process the application, the first set of nodes being sorted into a first frequency bin among the plurality of frequency bins corresponding with the application bin of the application, wherein the processor determines whether an estimated power consumption by the processing nodes is less than an available power for the cluster and, when the estimated power consumption exceeds the available power, the processor reduces a frequency of processing a second application with a lower priority than the application.

12. The job scheduler according to claim 11, wherein the processor sorts the plurality of nodes into the plurality of frequency bins based on running a plurality of benchmark applications using the plurality of nodes, the plurality of benchmark applications including varying cycles per instruction (CPI) profiles, and determining a maximum allowable frequency of operation, corresponding with a frequency bin among the plurality of frequency bins, for each of the plurality of nodes for each of the CPI profiles of the plurality of benchmark applications.

13. The job scheduler according to claim 11, wherein the processor sorts the application into the application bin among the plurality of application bins based on processing the application one or more times at respective one or more frequencies to determine the frequency scaling characteristic of the application, the frequency scaling characteristic of the application corresponding with the application bin among the plurality of application bins.

14. The job scheduler according to claim 11, wherein the processor determines whether the first set of nodes is idle and, when the first set of nodes is not idle, the processor selects a second set of nodes from a second frequency bin adjacent to the first frequency bin as the processing nodes.

\* \* \* \* \*